United States Patent [19]

Mori

[11] 4,424,801

[45] Jan. 10, 1984

[54] SOLAR DIRECTION SENSOR

[76] Inventor: Kei Mori, 3-16-3-501, Kaminoge, Setagaya-ku, Tokyo, Japan

[21] Appl. No.: 269,396

[22] Filed: Jun. 1, 1981

[30] Foreign Application Priority Data

Jun. 10, 1980 [JP] Japan ............................. 55-78261
Oct. 16, 1980 [JP] Japan ............................. 55-144926

[51] Int. Cl.³ ............................................. F24J 3/02
[52] U.S. Cl. ............................. 126/425; 250/203 R; 353/3
[58] Field of Search ................. 126/425, 424; 353/3; 250/203 R, 491.1

[56] References Cited

U.S. PATENT DOCUMENTS

| 3,268,185 | 8/1966 | Eckerman | 250/203 R |
| 3,305,686 | 2/1967 | Carter | 126/425 |
| 3,308,299 | 3/1967 | Dardarian | 250/203 R |
| 3,370,293 | 2/1968 | Green | 250/203 R |
| 3,448,280 | 6/1969 | Blitchington | 250/203 R |
| 3,780,966 | 12/1973 | Newcomb | 250/203 R |
| 3,996,917 | 12/1976 | Trihey | 126/425 |
| 4,135,493 | 1/1979 | Kennedy | 126/425 |
| 4,179,612 | 12/1979 | Smith | 126/425 |
| 4,225,781 | 9/1980 | Hammons | 126/425 |
| 4,314,546 | 2/1982 | Miller | 126/425 |

Primary Examiner—Daniel J. O'Connor
Attorney, Agent, or Firm—Merchant, Gould, Smith, Edell, Welter & Schmidt

[57] ABSTRACT

The solar direction sensor disclosed a solar direction sensor which is mounted on an apparatus for collecting solar energy by precisely following the movement of the sun.

The solar direction sensor is characterized in that it has a cylinder, an opaque flange mounted on the top end portion of the cylinder and having a diameter smaller than the inner diameter of the cylinder and at least two pair of beam sensor disposed at symetric positions on the lower end portion of the cylinder, the diameter of the inner end of each of the beam sensors are equal to the inner diameter of the flange.

6 Claims, 9 Drawing Figures

SOLAR DIRECTION SENSOR

SUMMARY OF THE INVENTION

The present invention relates to a solar direction sensor for detecting the position of the sun. More particularly, the present invention relates to a solar direction sensor which is mounted on an apparatus for collecting solar energy and which is suitably used for causing the solar energy collecting apparatus to precisely follow the movement of the sun.

In addition, the present invention relates to a solar collecting apparatus which can follow the movement of the sun precisely and can collect solar energy at a high efficiency.

Recently, developments and research have been made in various fields for effective utilization of solar energy with a view to meeting the request of saving energy. In order to effectively utilize solar energy, it is first of all important to effectively collect solar energy, and for this purpose, it is necessary to cause a solar energy collecting apparatus to precisely follow the movement of the sun and collect the solar energy at the highest efficiency.

Many proposals have heretofore been made for effective collection of solar energy by causing a solar energy collecting apparatus to automatically follow the movement of the sun. In the conventional techniques, since it is detected whether or not the solar energy collecting apparatus faces the sun it cannot determine how the incident angle of sun beams deviates from the direction of the solar energy collecting apparatus. Therefore, the operation of causing the solar energy collecting apparatus to follow the movement of the sun cannot be performed smoothly.

Accordingly, it is a primary object of the present invention to overcome the aforementioned defect of the conventional techniques.

A further object of the present invention is to provide a solar direction sensor which is mounted on a solar energy collecting apparatus and is suitably used for causing the solar energy collecting apparatus to automatically follow the movement of sun.

Still a further object of the present invention is to provide a solar energy collecting apparatus in which the operation of causing the solar energy collecting apparatus to follow the movement of the sun can be performed very smoothly, firstly by detecting the position of the sun, then by calculating the deviation of the incident angle of sun beams on the basis of output signals from the beam sensors, lastly by correcting said deviation, and shifting the solar energy collecting apparatus toward the sun according to said detected deviation. According to one aspect of the invention, there is provided a solar direction sensor which comprises a cylinder, an opaque flange mounted on the top end portion of said cylinder and having a diameter smaller than the inner diameter of said cylinder, at least two pair of beam sensors disposed at symmetric positions on the lower end portion of said cylinder, the diameter of the inner end of each of the beam sensors being equal to the inner diameter of said flange, and a beam sensor disposed on the top face of said flange.

In further accordance with the invention, there is provided a solar energy collecting apparatus which comprises a lens system for converging sun beams, a sun beam collecting zone for collecting the sun beam converged by said lens system, a first sensor for detecting the total quantity of the sun beams, a second sensor for detecting the quantity of directly incident sun beams, which is arranged so that one end of the second sensor falls in contact with the periphery of the beam flux leading to a sun image formed by said lens system in a range h ($0 \leq h \leq f$) of the focal distance f of said lens system and the other end of the second sensor is located outwardly of said beam flux, and a third sensor having the same structure as that of said second sensor and arranged symmetrically with said second sensor to detect the quantity of indirect sun beams, wherein the quantity of deviation of the incident angle from said lens system is detected from output signals of said first, second and third sensors.

Other objects of the present invention will become obvious from the embodiments indicated in the appended claims. Furthermore, various advantages not referred to herein will certainly become apparent when the present invention is carried out by one skilled in the art.

BRIEF DESCRIPTION OF THE DRAWINGS

A preferred embodiment of the invention will now be described in detail with reference to the accompanying drawings, wherein the same reference numerals are used to designate similar parts throughout the different views, in which.

DETAILED DESCRIPTION OF THE INVENTION

Figure 1:
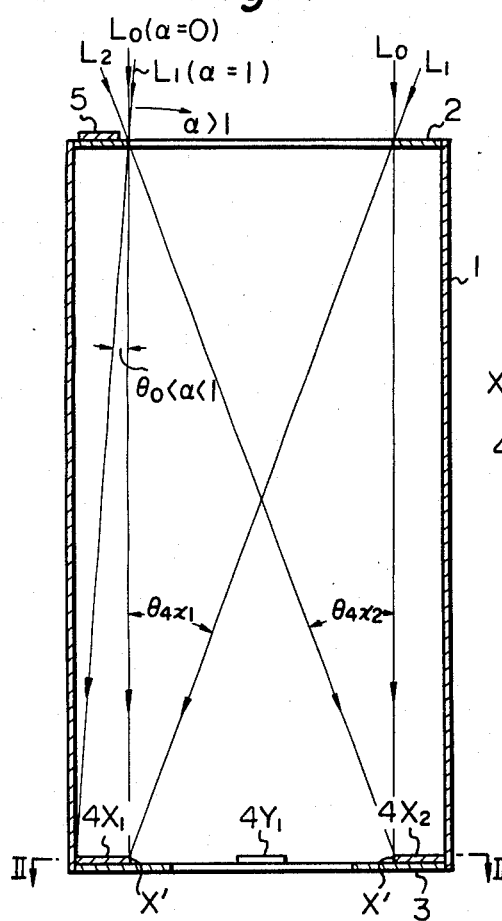
FIG. 1 is a sectional side view illustrating one embodiment of the solar direction sensor according to the present invention.
Figure 2:
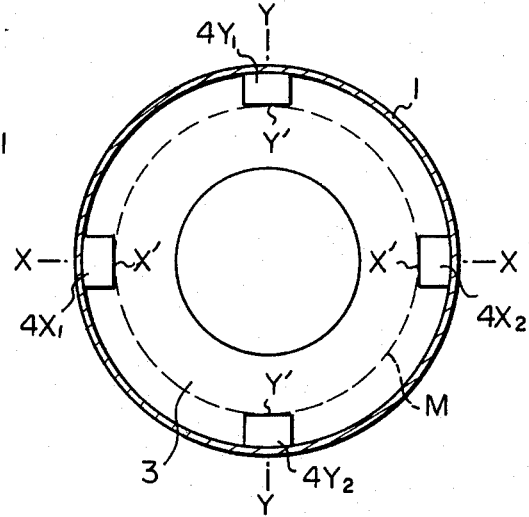
FIG. 2 is a view showing the section taken along the line II—II in FIG. 1.
Figure 3:
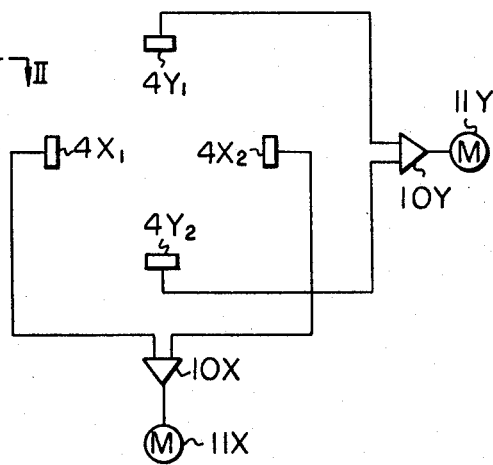
FIG. 3 is a diagram illustrating an example of an electric circuit including the solar direction sensor according to the present invention.

FIG. 1 is a sectional side view illustrating a solar direction sensor according to the present invention, and FIG. 2 is a view showing the section taken along the line II—II in FIG. 1. Reference numerals 1, 2 and 3 represent an opaque cylinder, a flange formed on the top end of the opaque cylinder and a flange formed on the lower end of the cylinder, respectively. At least two pair of beam sensors $4X_1$ and $4X_2$ or $4Y_1$ and $4Y_2$ are disposed on the top face of the lower frange 3 so that they face each other, and the inner side end X' or Y' of each beam sensor is arranged at the position equal to the inner diameter of the upper flange 2. Accordingly, when the cylinder 1 is parallel to sun beams, that is, when sun beams are incident in a direction $L_0$, direct sun beams do not arrive at the sun beam sensors $4X_1$ and $4X_2$ or $4Y_1$ and $4Y_2$, and outputs of these sun beam sensors respond only to indirect spacious rays. On the other hand, when the sun beams are incident in a direction of $L_1-L_0$, that is, when the cylinder 1 is in a range of $\theta_{4X1}$ to the incident direction, direct sun beams arrive only at the beam sensor $4X_1$ but are not incident on the beam sensor $4X_2$. When the sun beams are incident in a direction of $L_0-L_2$, that is, when the cylinder 1 is in a range of $\theta_{4X2}$, direct sum beams are not incident on the beam sensor $4X_1$ but are incident only on the beam sensor $4X_2$. Accordingly, if the outputs of the beam sensors $4X_1$ and $4X_2$ are compared with each other by a difference amplifier 10X and a motor 11X is driven so that the difference between the two outputs becomes zero, a solar energy collecting apparatus is always directed to the sun with respect to the axis X and it can collect the solar energy at the highest efficiency. When the incident direction of the sun beams deviates in connection with the axis Y, the outputs of the beam sensors $4Y_1$ $4Y_2$ are compared by a differential amplifier 10Y and a motor 11Y is driven so that the difference between the two outputs is zero, with the result that in the same manner as described above, the solar energy collecting apparatus is always directed to the sun and the solar energy can be collected at the highest efficiency. A beam sensor 5 is disposed on the top face of the upper flange 2 to detect the presence or absence of sun beams and effect the above-mentioned sun beam-following operation only when sun beams are present, while stopping the above operation when sun beams are absent, for example, at night. In the embodiment shown in FIG. 1, if the beam sensors 5, $4X_1$ and $4X_2$ are arranged as a sensor for detecting the total quantity of sun beams, a sensor for detecting the quantity of directly incident sun beams (or a sensor for detecting the quantity of indirect sun beams) and a sensor for detecting the quantity of indirect sun beams (or a sensor for detecting directly incident sun beams), respectively, since there is established the following relation:

$$S = D + I \quad (1)$$

among the total quantity S (Lx) of sun beams, the quantity D (Lx) of directly incident sun beams and the quantity I (Lx) of indirect sun beams, the following equation can be derived:

$$S = \beta S + (1 - \beta)S \quad (2)$$

wherein $\beta$ stands for the ratio of directly incident sun beams ($\beta = D/S$).

Figure 4:
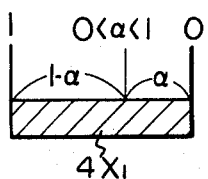
FIG. 4 is an enlarged view showing the zone of the sensor $4X_1$ shown in FIG. 1.

Supposing that an output signal relative to the total sun beam quantity S detected by the beam sensor 5 is $L_0$ (mV), an output signal relative to the direct sun beam quantity D detected by the beam sensor $4X_1$ is $L_1$ (mV) and an output signal relative to the indirect sun beam quantity I detected by the beam sensor $4X_2$ is $L_2$ (mV) and also supposing that the side of the beam sensor $4X_1$ (or $4X_2$) that comes in contact with the beam flux in the cylinder is designated as 0 and the ratio of the position where the periphery of said beam flux intersects the beam sensor $4X_1$ (or $4X_2$), as shown in FIG. 4, to the entire length of the beam sensor is designated as $\alpha$, when the sun beams are in the range of $L_0-L_1$, that is, when $\alpha$ is in the range of $0 < \alpha < 1$, the sun beams are directly incident on the portion $\alpha$ of the beam sensor $4X_1$ and the indirect sun beams are received by the portion $(1-\alpha)$ of the beam sensor $4X_1$, while the beam sensor $4X_2$ receives only the indirect sun beams. Accordingly, the following relations are established:

$$L_1 = \alpha \frac{1}{\delta} D + (1 - \alpha)\frac{1}{\delta} I \quad (3)$$

and $$L_2 = \frac{1}{\delta} I = \frac{1}{\delta}(1 - \beta)S = (1 - \beta)L_0 \quad (4)$$

wherein $\delta$ stands for the conversion coefficient ($= S/L_0$) and $\beta$ stands for the ratio of directly incident beams ($= D/S$).

If the above formula (3) is arranged as follows:

$$L_1 = \frac{1}{\delta}\{\alpha D + (1 - \alpha)I\}$$

$$= \frac{1}{\delta}\{\alpha \beta S + (1 - \alpha)(1 - \beta)S\}$$

$$= \frac{1}{\delta}(\alpha \beta S) + (1 - \alpha)L_2$$

$$= (L_0)\alpha\beta + (1 - \alpha)L_2$$

$$= \alpha\beta L_0 + L_2 - \alpha L_2$$

$$= \alpha(\beta L_0 - L_2) + L_2$$

$$= \alpha(L_0 - 2L_2) + L_2$$

the following relation can be derived:

$$\alpha = \frac{L_1 - L_2}{L_0 - 2L_2} \quad (5)$$

As is apparent from the formula (5), $\alpha$ is expressed only by the quantities $L_0$, $L_1$ and $L_2$ that can be observed and is independent from the direct beam ratio $\beta$ and the conversion coefficient $\delta$. In short, $\alpha$ can be determined irrespectively of the factors $\beta$ and $\delta$. When the incident angle of sun beams to the cylinder 1 is in the range of $0 < \alpha < 1$, this incident angle is directly determined by the output signals of the sensors 5, $4X_1$ and $4X_2$. Accordingly, if the operation is made according to the formula (5) by using the output signals of the sensors 5, $4X_1$ and $4X_2$, the deviation angle of the cylinder 1 from the incident direction of sun beams can be known. Therefore, it becomes possible to control the cylinder 1 so that the cylinder 1 is allowed to turn in a quantity corresponding to this deviation angle, and over-following or over-hunting of the cylinder 1 can effectively be prevented.

As is apparent from FIG. 4, the case of $\alpha > 1$ is equivalent to the case of $\alpha = 1$, and the control system functions so that the value of $\alpha$ of the formula (5) is equal to 1. Accordingly, even if the incident direction of sun beams is considerably deviated from the direction of the cylinder 1 because of cloudy weather or the like, the cylinder 1 is caused to perform a sun beam-following movement promptly to the position of $\alpha = 1$ and when the cylinder 1 is then introduced in the region of $0 < \alpha < 1$, the cylinder 1 is driven in a quantity corresponding to the deviation angle.

Figure 5:
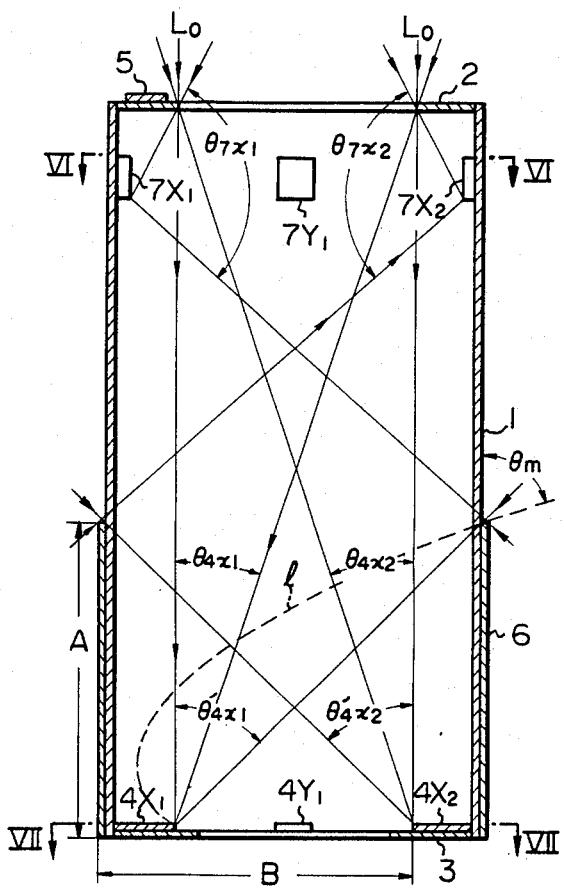
FIG. 5 is a sectional side view illustrating another embodiment of the solar direction sensor according to the present invention.
Figure 6:
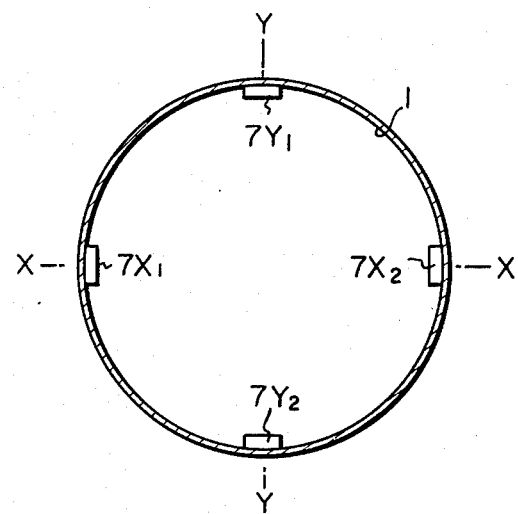
FIG. 6 is a view showing the section taken along the line VI—VI in FIG. 5.
Figure 7:
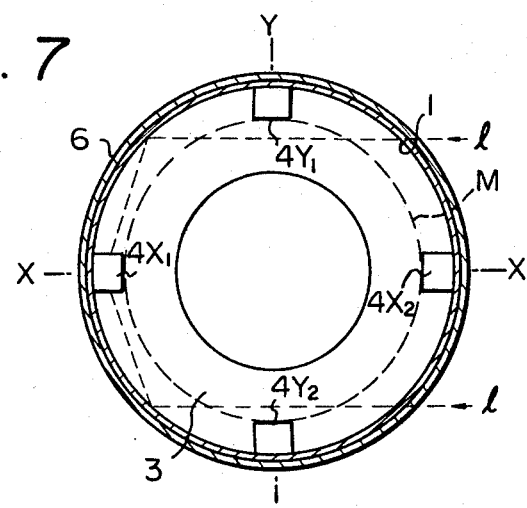
FIG. 7 is a view showing the section taken along the line VII—VII in FIG. 5.

FIG. 5 is a sectional side view illustrating another embodiment of the present invention, FIG. 6 is a view showing the section taken along the line VI—VI in FIG. 5, and FIG. 7 is a view showing the section taken along the line VII—VII in FIG. 5. In this embodiment, the cylinder 1 is formed of a transparent material, and an opaque film 6 is applied to the lower half of the cylinder 1. By this arrangement, sun beams of an incident angle included in the range of $\theta'_{4X1}$ can be detected by the beam sensor $4X_1$ and sun beams of an incident angle included in the range of $\theta'_{4X2}$ can be detected by the beam sensor $4X_2$. For example, if the length of the opaque portion A is made equal to the length B between the inner ends of the beam sensors $4X_1$ and $4X_2$, which length B passes through the center of the cylinder 1, a relation of $\theta'_{4X1} = \theta'_{4X2} = 45°$ is established, and if a circular cylinder is used as the cylinder 1 in this case, spiral touring of beams as indicated by a dotted line l in FIGS. 5 and 7 occurs, and the detectable range of incident angles can be broadened (it was confirmed by experiments that the maximum incident angle $\theta m$ is about 70°). When the beam sensors $4Y_1$ and $4Y_2$ are disposed symmetrically with each other with respect to the axis X as shown in FIG. 7, the incident angles with respect to the axis X can also be detected in the same manner as described above. In this case, if at least two pair of beam sensors $7X_1$ and $7X_2$ or $7Y_1$ and $7Y_2$ are disposed on the inner wall of the cylinder 1 in the vicinity of the top end portion thereof so that these beam sensors face each other, incident angles of the ranges $\theta_{4X1}$ and $\theta_{4X2}$ with respect to the axis Y can be detected by the beam sensors $4X_1$ and $4X_2$ and the incident angles in the ranges of $\theta_{7X1}$ and $\theta_{7X2}$ with respect to the axis Y can be detected by the beam sensors $7X_1$ and $7X_2$. Accordingly, a minute deviation between the sun beam incident direction and the direction of the cylinder 1 can precisely be detected by the beams sensors $4X_1$ and $4X_2$ while a large deviation can be detected by the beam sensors $7X_1$ and $7X_2$. With respect to the axis X, the same functions as made by the beam sensors $4X_1$ and $4X_2$ and the beam sensors $7X_1$ and $7X_2$ may be done by the beam sensors $4Y_1$ and $4Y_2$ and the beam sensors $7Y_1$ and $7Y_2$, respectively. In each of the foregoing embodiments shown in FIGS. 1 and 5, there may be adopted a modification in which the lower flange 3 is formed of a semi-transparent material and a display mark M having a diameter equal to the inner diameter of the upper flange 2 is formed on the lower flange 3. In this modification, the fringe of sun beams arriving at the lower flange through the upper flange 2 can be seen with the eyes with reference to this mark M, whereby the operations of attaching the beam sensors $4X_1$, $4X_2$, $4Y_1$, $4Y_2$, etc. and adjusting the set position of the cylinder 1 can be facilitated.

As will be apparent from the foregoing description, according to the present invention, there can be provided a solar direction sensor which has a simple structure and is constructed inexpensively and which can detect the direction of sun beams precisely.

Now will be described a solar energy collecting apparatus according to the present invention.

Figure 8:
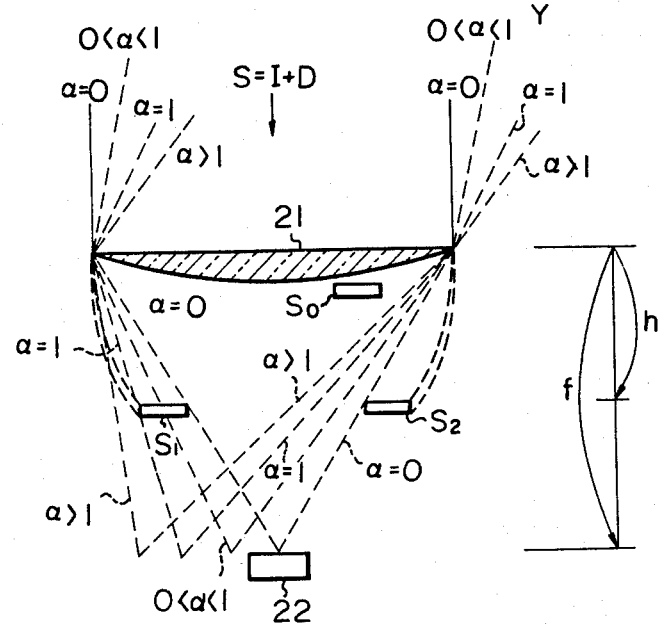
FIG. 8 is a view diagrammatically illustrating the structure of one embodiment of the solar energy collecting apparatus according to the present invention; and, FIG. 9 is an enlarged view showing the zone of the sensor $S_1$ shown in FIG. 8.

FIG. 8 is a view diagrammatically illustrating the structure of one embodiment of the sun beam collecting apparatus according to the present invention. In FIG. 8, reference numerals 21 and 22 represent a lens system for concentrating sun beams and a sun beam collecting zone for collecting the sun beams concentrated by the lens system 1, respectively. The sun beams collected by the sun beam collecting zone 2 are guided to a predetermined position through a photoconductor not shown in the drawings, and they are directly used as illuminating rays or they are utilized after they have been converted to electric energy, heat energy or the like. Symbols $S_0$, $S_1$ and $S_2$ represent a sensor for detecting the total quantity of sun beams, a sensor for detecting the quantity of directly incident sun beams (or a sensor for detecting the quantity of indirect sun beams) and a sensor for detecting the quantity of indirect sun beams (or a sensor for detecting the quantity of directly incident sun beams), respectively. The sensor $S_1$ and $S_2$ are disposed symmetrically with each other so that one end of each sensor comes in contact with the periphery of the beam flux leading to the sun image formed by the lens system in a range h ($0 \leq h \leq f$) of the focal distance f of the lens system 1 and the other end is located outwardly of said beam flux.

As described in the above embodiment the following equations can be derived:

$$S = D + I \qquad (1')$$

$$S = \beta S + (1 - \beta)S \qquad (2')$$

Figure 9:
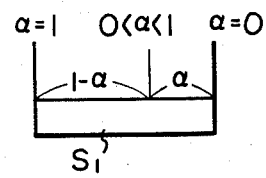

Supposing that an output signal relative to the total sun beam quantity S detected by the beam sensor $S_0$ is $L_0$ (mV), an output signal relative to the direct sun beam quantity D detected by the beam sensor $S_1$ is $L_1$ (mV) and an output signal relative to the indirect sun beam quantity I detected by the beam sensor $S_2$ is $L_2$ (mV) and also supposing that the side of the beam sensor $S_1$ (or $S_2$) that comes in contact with the periphery of the beam flux leading to the sun image formed by the lens system 21 as 0 and the ratio of the position where the periphery of said beam flux intersects the beam sensor $S_1$ (or $S_2$) as shown in FIG. 9, to the entire length of the beam sensor is designated as $\alpha$, when $\alpha$ is in the range of $0 < \alpha < 1$, the sun beams through the lens system 21 are directly incident on the portion $\alpha$ of the beam sensor $S_1$ and the indirect sun beams are received by the portion $(1-\alpha)$ of the beam sensor $S_1$, while the beam sensor $S_2$ receives only the indirect sun beams. Accordingly, the following relations are established:

$$L_1 = \alpha \frac{\gamma}{\delta} D + (1 - \alpha) \frac{\gamma}{\delta} I \qquad (3')$$

$$L_2 = \frac{\gamma}{\delta} I = \frac{\gamma}{\delta} (1 - \beta)S = \gamma(1 - \beta)L_0 \qquad (4')$$

wherein $\gamma$ stands for the magnification of sun beam quantity.

If the above formula (3') is arranged as follows:

$$L_1 = \frac{\gamma}{\delta} \{\alpha D + (1 - \alpha)I\}$$

$$= \frac{\gamma}{\delta} \{\alpha\beta S + (1 - \alpha)(1 - \beta)S\}$$

$$= \frac{\gamma}{\delta} (\alpha\beta S) + (1 - \alpha)L_2$$

$$= (\gamma L_0)\alpha\beta + (1 - \alpha)L_2$$

$$= \alpha\beta\gamma L_0 + L_2 - \alpha L_2$$

$$= \alpha(\beta\gamma L_0 - L_2) + L_2$$

$$= \alpha(\gamma L_0 - 2L_2) + L_2$$

the following relation can be derived:

$$\alpha = \frac{L_1 - L_2}{\gamma L_0 - 2L_2} \qquad (5')$$

In this case, the operation is substantially the same as in the formula (5).

As is apparent from the foregoing description, the detectable incident angle can be determined by the length of the sensors $S_1$ and $S_2$. For example, if the sensors $S_1$ and $S_2$ are extended to the end of the lens system 21 as indicated by a dotted line in FIG. 8, deviation angles of up to about 180° can be detected. Furthermore, if another pair of sensors similar to the sensors $S_1$ and $S_2$ are arranged on a line intersecting at right angles the line connecting the sensors $S_1$ and $S_2$ to each other, the quantity of deviation in the direction rectangular to the paper plane of the drawings can also be detected. Moreover, each of the sensors $S_1$ and $S_2$ may be constructed by a plurality of sensors, or a plurality of lenses may be arranged in the regions extended to the end of the lens system 21 from the sensors $S_1$ and $S_2$.

As will readily be understood from the foregoing description, according to the present invention, the deviation of the incident angle of sun beams from the direction of the lens system 21 can be detected, and therefore, it is possible to drive the control system in a quantity corresponding to this deviation, whereby the operation of causing the lens system to follow the movement of the sun can be accomplished very smoothly.

I claim:

1. A solar direction sensor comprising: a cylinder; an opaque flange mounted on the top end portion of said cylinder and having a diameter smaller than the inner diameter of said cylinder; means for detecting the position of the sun, said means including; a first beam sensor disposed on the top face of said flange and having an output signal $L_0$; at least two pairs of beam sensors including a second sensor having an output signal $L_1$ and third beam sensor having an output signal $L_2$, said second and third beam sensors disposed at symmetrical positions on the lower end portion of said cylinder, the diameter of the inner end of each of the beam sensors being equal to the inner diameter of said flange; the side of the second or third sensor that contacts solar beam flux in the cylinder is designated as 0, and the ratio of the position where the periphery of said beam flux intersects said first or second beam sensor to the entire length of the sensor is designated as $\alpha$; and said means detects the position of the sun by obtaining the value of $\alpha$ from the following equation $$\alpha = \frac{L_1 - L_2}{L_0 - 2L_2}.$$

2. A solar direction sensor as set forth in claim 1, wherein the upper half of said cylinder is transparent and the lower half of said cylinder is opaque.

3. A solar direction sensor as set forth in claim 2, wherein at least two pair of beam sensors are disposed at symmetric positions on the inner wall of the upper portion of said cylinder.

4. A solar direction sensor as set forth in claims 1 or 2 wherein said cylinder is a circular cylinder.

5. A solar direction sensor as set forth in claims 1 or 2 wherein a semi-transparent flange is formed on the lower end portion of said cylinder and a display mark having a diameter equal to the inner diameter of said flange disposed on the top end portion of said cylinder is drawn on said semi-transparent flange.

6. A solar direction sensor comprising: a circular cylinder, an opaque flange having a beam sensor disposed on the top face thereof, said flange mounted on the top end portion of said cylinder and having a diameter smaller than the inner diameter of said cylinder and at least two pairs of beam sensors disposed at symmetric positions on the lower end portion of said cylinder, the diameter of the inner end of each of the beam sensors being equal to the inner diameter of said flange; the upper half of said cylinder being transparent and the lower half of said cylinder being opaque; and at least two pairs of beam sensors are disposed at symmetric positions on the inner wall of the upper portion of said cylinder.

* * * * *